United States Patent [19]

Mason

[11] 4,327,866
[45] May 4, 1982

[54] DIFFERENTIAL PUMPING SYSTEM

[76] Inventor: Claude C. Mason, 3120 St. Catherine, Florrisant, Mo. 63033

[21] Appl. No.: 154,952

[22] Filed: May 30, 1980

[51] Int. Cl.³ .......................... B05B 1/28; A62C 13/60
[52] U.S. Cl. ...................................... 239/104; 239/61; 239/304
[58] Field of Search ............... 239/104, 112, 124, 304, 239/67, 61; 194/3; 222/1

[56] References Cited

U.S. PATENT DOCUMENTS 3,049,302  8/1962  Simmons, Jr. ...................... 239/304
3,276,628  10/1966  Cline .................................. 239/112
4,019,653  4/1977  Scherer et al. ........................ 239/61

Primary Examiner—James B. Marbert
Attorney, Agent, or Firm—Head & Johnson

[57] ABSTRACT

A pumping system for use in a self-service car wash for supplying liquid at a high or low-pressure having a pump in communication with a liquid applicator and in communication with a first liquid supply. A second liquid supply is in communication with an inlet portion of the pump through a supply valve which selectively permits liquid to be drawn from one of the liquid supplies. A by-pass mechanism, in communication with the pump, is provided to reduce the pressure of the liquid supplied from the pump to the liquid applicator. A control mechanism is connected to the supply valve and the by-pass mechanism whereby when the control mechanism is activated the supply valve and the by-pass mechanism are actuated and liquid from the second liquid supply is supplied to the liquid applicator at a pressure lower than liquid supplied from the first liquid supply.

23 Claims, 2 Drawing Figures

DIFFERENTIAL PUMPING SYSTEM

BACKGROUND OF THE INVENTION

1. Field of the Invention

The present invention relates to a vehicle washing system and, more particularly, to such a system which is provided with the capability of supplying a chemical through the existing high pressure pumping system under low pressure.

2. Description of the Prior Art

In order to preserve the quality and condition of the body of an automobile it is advisable to thoroughly wash and clean any dirt thereon to prevent the retention of moisture therein which aids in the formation of rust. Many individuals take their vehicles to self-service car washes which are coin operated and provide high-pressure application of soap solution or water to rinse the automobile. Many of these car wash systems have added the additional features of supplying not only soap and water but also liquid wax, engine degreaser solvent and whitewall cleaner. These additional chemical products are dispensed through the normal boom and wand assemblies, however, these chemicals are much too expensive to dispense at the high-pressure pumping rate of three or four gallons per minute. It is therefore advisable to deliver these chemicals at a lower pressure which necessitates the addition of a separate low-pressure pumping system which adds to the cost of the construction and maintenance of the auto wash system.

Two basic methods have been developed in order to dispense a chemical at low-pressure and both involve the addition of a separate pumping station, which is connected electrically to a high-pressure pumping assembly, and is connected through a separate plumbing line to each individual bay and the boom and wand assemblies. At the boom assembly an electric solenoid and check valve assembly must be installed on the alternate supply line for the low-pressure solution. This basic system has several design deficiencies in that it requires electrical service to the boom assembly where none was required before and it requires a separate plumbing line from the extra pumping station to each bay. Further, the extra plumbing line cannot be prevented from freezing in the winter time by the normal freezing protection of a "weep" system that is utilized in the high-pressure line. To prevent freezing this line is normally wrapped with heat tape or is supplied with a forced air heating apparatus.

The second type of low-pressure system which is currently being utilized uses basically the same features as the first type of system as described above with exception of the method by which to prevent the line from freezing. In the second system, the low-pressure solution is recirculated in a closed loop plumbing line from the additional pumping station to the boom and wand assembly and then back to the pumping station. The chemical remains in circulation at all times and when a low-pressure chemical is chosen by the operator, the valve at the boom assembly is merely opened which allows the alternate supply line to supply its product to the wand. This system also has all the disadvantages of the first system with the additional disadvantage of having an extra line from the extra pumping station to the boom and wand assembly to provide the closed loop. It does not appear that there is a simple system which may be easily added to an existing auto wash system and which can provide a low-pressure application of a liquid through an existing high-pressure system without the addition of an extra pumping station and additional supply lines.

SUMMARY OF THE INVENTION

The present invention generally provides a car wash pumping system which can dispense any number of additional chemicals at a low-pressure utilizing a high-pressure pump without the necessity of an additional pump, pumping controls, and fluid lines to the boom and wand assemblies. The present invention may be easily installed within existing car wash systems and is of a low cost and low maintenance design. Further, the present invention does not require additional lines to be run to the boom and wand assemblies thereby not requiring additional means to prevent the freezing of these lines, such as the application of heat tape or a closed loop system, both of which are time consuming to install and expensive to operate. Further, the present invention allows for the application of cleaning chemical solutions at a low-pressure to prevent the unnecessary waste of these chemicals as well as reducing the hazard of splashing these chemicals upon the operator.

The present invention, more particularly, comprises a pump having an inlet and an outlet portion with the inlet portion of the pump in communication through a conduit to a first liquid supply, such as water and/or soap. The outlet portion of the pump is in communication through a conduit to the boom and wand assembly within each bay of the car wash. A second liquid supply, containing whitewall cleaner or engine degreaser chemicals, is in communication with the inlet portion of the pump through a supply valve, such as a three-way valve, to selectively permit liquid to be drawn from only one of the liquid supplies. A by-pass mechanism in communication with inlet and outlet portions of the pump and being comprised of a conduit and a by-pass valve, is provided so as to reduce the pressure of the liquid flowing from the pump to the boom and wand assembly. A coin operated control mechanism is in electrical communication with the supply valve and the by-pass mechanism, such that when an operator selects a fluid from the first supply, such as water or soap and water, the by-pass mechanism is closed and the high-pressure pump is operated at full capacity to supply the fluid under high-pressure to the boom and wand assembly. When the operator selects a chemical from the second supply the by-pass mechanism is opened and the effective pumping pressure of the pump is reduced so that the chemical is supplied to the boom and wand assembly at a lower pressure so as not to waste these chemicals and to prevent any excess splashing of the chemicals onto the operator. When the operator has finished using the chemicals from the second liquid supply the control mechanism is returned to the first selected position for dispensing liquid from the first supply under high-pressure. The time delay only functions when you switch from the first liquid supply to the low pressure second liquid supply.

DETAILED DESCRIPTION OF THE PREFERRED EMBODIMENTS

Figure 1:
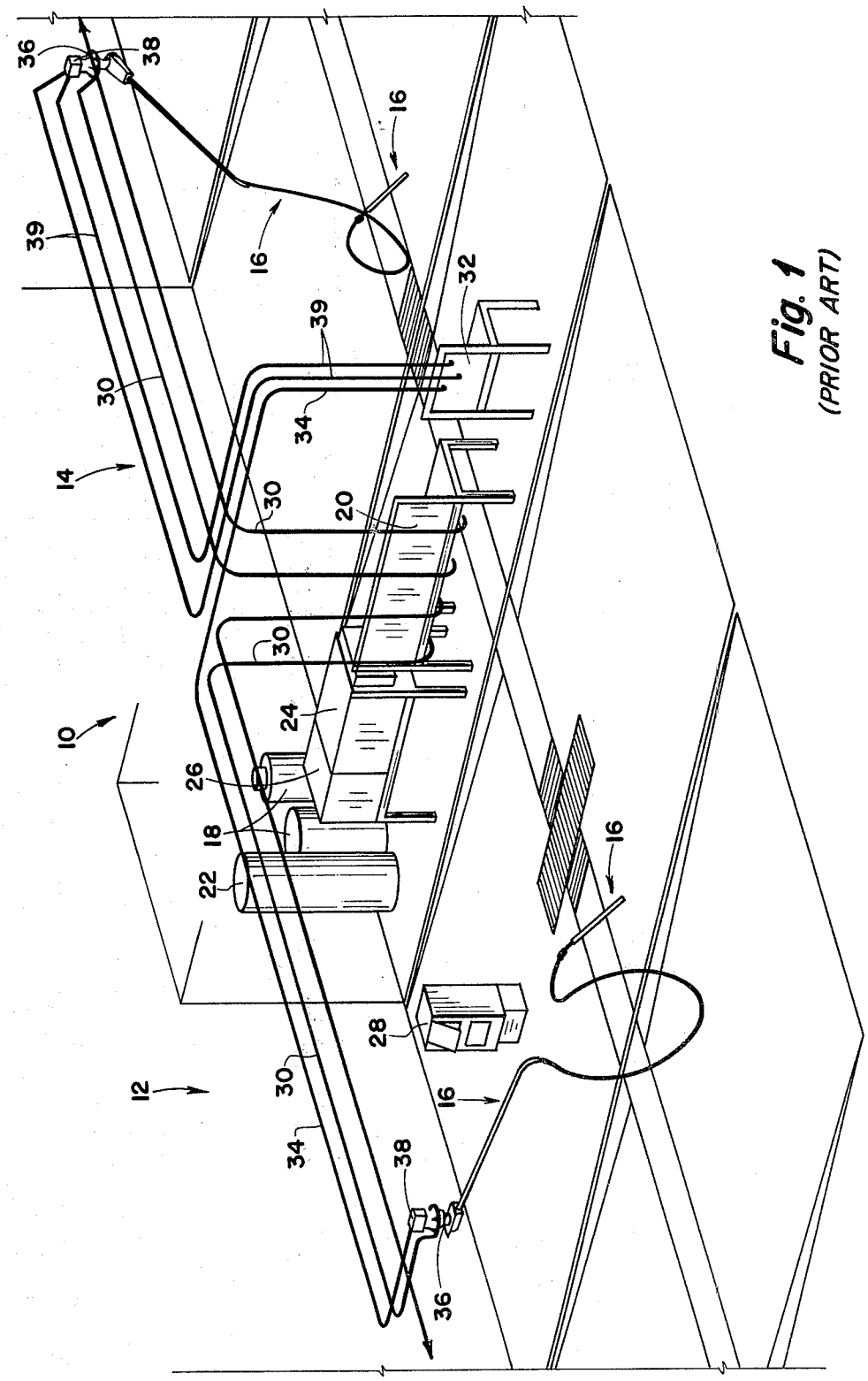
FIG. 1 is a perspective view of an auto wash system illustrating two separate prior art mechanisms for providing low-pressure application of fluid.

Referring to the drawings in detail, reference character 10 generally indicates an auto wash system and its related equipment. FIG. 1 shows an auto wash system utilizing two different prior art methods for providing a low-pressure fluid system as well as different methods of preventing the freezing of this low-pressure system. The auto wash system 10, as shown in FIG. 1, is divided into two separate bays 12 and 14 respectively. Each bay has a boom and wand assembly 16 centrally mounted to the roof or wall (not shown) thereof. Fresh water is fed from the municipal water supply to a water conditioning and heating module 18 where soap may be added, which is in turn connected to a control and pumping unit 20. The pumping unit 20 is comprised of a high-pressure pump and motor (not shown) as well as the related controls thereto. A hot water storage tank 22 and a soap storage tank 24 are in communication with the pumping unit 20. A chemical storage tank 26 acts as a second liquid supply of whitewall cleaning chemicals and degreasing chemicals. An electrical control box 28 which is coin operated is located within each of the bays 12 and 14 and the customer deposits coins therein to activate the auto wash system 10 as well as to make a selection between soap solution, rinse water or any other desired liquid. The pumping unit 20 is connected to the boom and wand assembly 16 by means of a first conduit 30 and the control box 28 is in electrical communication with the pumping unit 20.

When a customer inserts coins into the control box 28 and makes the selection for the product desired, an electrical signal travels to the controls within the pumping unit 20 which activates the pump to dispense the desired product to the boom and wand assembly 16 until a predetermined time cycle has expired.

When a degreaser chemical product from the chemical tank 26 is selected there is a need to drop the pressure of the dispensed liquid since these chemicals are much too expensive to dispense at the high-pressure pumping rate of the pump of between three and four gallons a minute. A first method to reduce the pressure is depicted in FIG. 1 and illustrated in bay 12. This system utilizes a separate low-pressure pumping station 32 which comprises a low-pressure pump, motor and necessary controls. The pumping station 32 is connected electrically to the control box 28 and is connected through a second conduit 34 to a pivotal junction 36 of the boom and wand assembly 16. An electric solenoid and check valve assembly 38 in electrical communication with the control box 28 is installed at the junction 36 and is connected to the conduit 34. When a low-pressure cycle for a chemical is chosen the valve 38 is opened and the pump within the low-pressure pumping station 32 is activated which permits the chemical to be sprayed under low-pressure.

This prior art system for providing a low-pressure cycle requires electrical service to the junction 36 as well as a separate conduit 34 and a separate pumping station 32. Further, the second conduit 34 cannot be prevented from freezing by the normal freezing protection "weep" system that is utilized on the high-pressure conduit 30. Other means of preventing the second conduit 34 from freezing must be utilized such as application of heat tape or a heated air system (not shown). Further, this system is expensive to install in existing car washes and requires additional floor space for the pumping station 32.

A second type of low-pressure system is depicted in FIG. 1 and illustrated in bay 14. This second type of system utilizes the same features as the first prior art system discussed above with the exception of the method by which the low-pressure line or conduit 34 is prevented from freezing. In this second type of low-pressure system a pair of conduits 39 are connected from the low-pressure pumping station 32 to the check valve assembly 38 at the junction 36 and provides a closed loop wherein the low-pressure fluid is merely recirculated through the loop at all times to prevent freezing. Again this system has all the disadvantages of the other prior art system.

There has been a need for a low cost low-pressure pumping system which is easily installed on existing car wheels to provide a low-pressure option for the application of chemicals without the necessity of additional plumbing and pumps.

Figure 2:
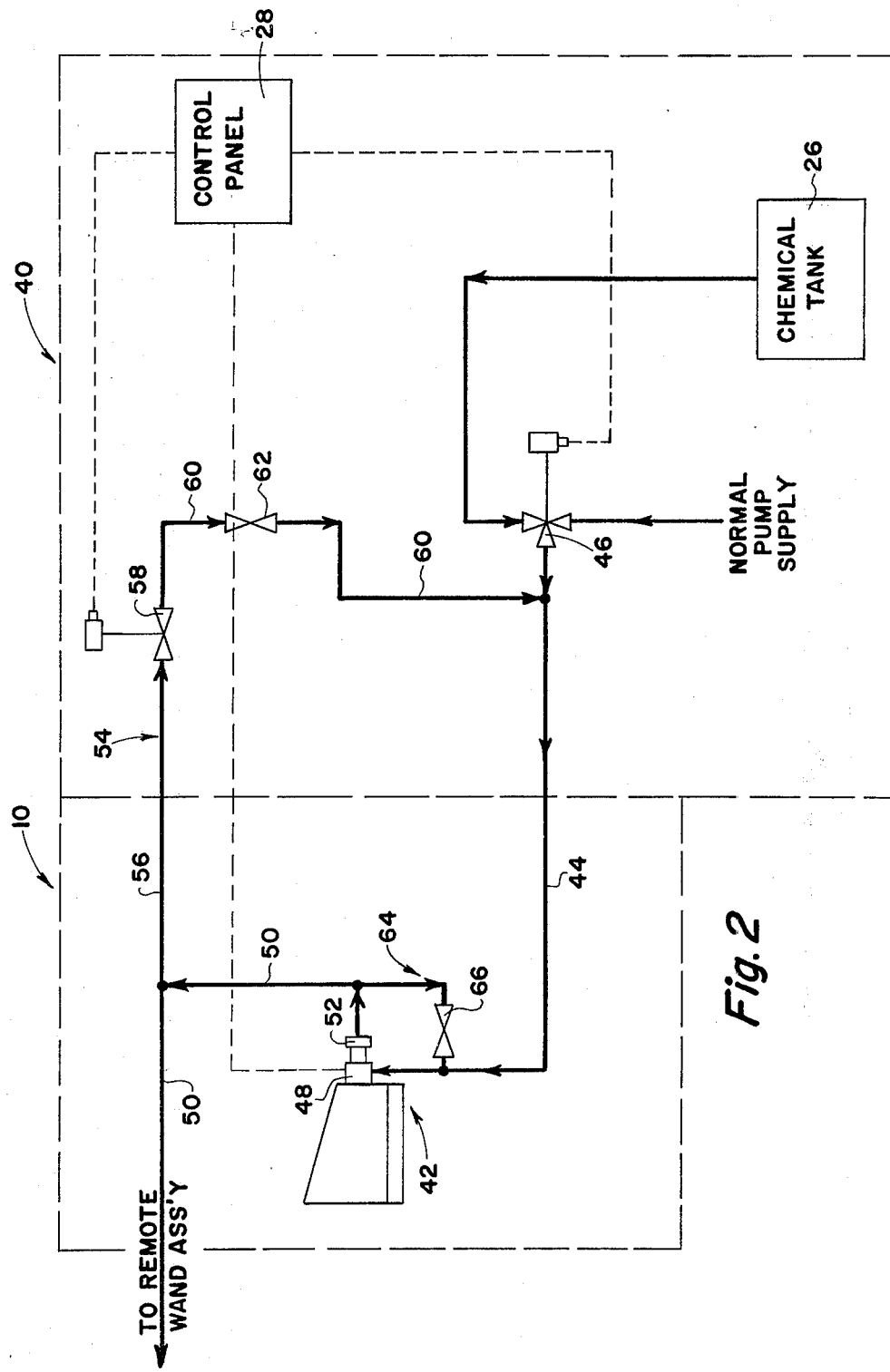
FIG. 2 is a schematic diagram of a pumping system embodying the present invention.

FIG. 2 is a schematic diagram of a pumping system 40 which has the capability of providing a liquid to the boom and wand assemblies 16 at either high or low-pressure without the need of a second low-pressure pumping station 32 and additional conduits 34 or 39 to the boom and wand assembly 16. The pumping system 40 is provided with a high-pressure pump and motor means 42 in communication with the control box 28 and which is in communication with a normal water supply through a conduit 44 and a three-way control valve 46. Means to add soap to this water is connected to the conduit 44 and is comprised of the water conditioning and heating module 18, as shown in FIG. 1. The conduit 44 is connected to an inlet portion 48 of the pump 42 and a conduit 50 extends from an outlet portion 52 of the pump 42 to the boom and wand assemblies 16. In order to provide a low-pressure cycle, a by-pass mechanism 54 is added and comprised of a conduit 56 connected to the conduit 50 and an electric by-pass solenoid and valve means 58, which is in electrical communication with the control box 28. A conduit 60 extends from the valve means 58 to a low-pressure adjusting valve 62 and then is connected to the conduit 44. A secondary mechanical by-pass mechanism 64 is connected from the conduit 50 to the conduit 44 and includes a mechanically operated valve 66 which further regulates the pressure of the liquid delivered to the boom and wand assembly 16.

When a high-pressure cycle is selected at the control box or panel 28 the pump 42 is activated and soap and water or water is drawn from the normal pump supply through the three-way valve 46 and the conduit 44 to the pump 42 and from there through the conduit 50 to the remote boom and wand assembly 16. The valve 58 is placed on the closed position to prevent any liquid from being passed through the by-pass mechanism 54.

When a low-pressure chemical cycle is selected at either the control panel 28 or at a remote electrical switch (not shown) at the boom and wand assembly 16, the three-way control valve 46 is activated to stop the flow of liquid from the normal pump supply and to allow fluid to be drawn from the chemical tank 26. The by-pass mechanism 54 remains in the closed position while the pump 42 purges the system 10 under high-pressure of any remaining pre-selected liquid. An adjustable time delay mechanism (not shown) in the control panel 28 is set so that as soon as the selected chemical reaches the boom and wand assembly 16 the valve means 58 is opened whereupon a portion of the liquid being pumped is by-passed through the conduits 56 and 60 which effectively drops the pressure of the liquid being delivered at the remote boom and wand assembly 16. This lower pressure is regulated by the low-pressure adjustment valve 62 either mechanically or automatically. When the operator selects a high-pressure cycle of either rinse water or soap at the control box 28, the three-way control valve 46 stops the flow of liquid from the chemical tank 26 and allows the flow of fluid from the normal pump supply and the by-pass valve 58 closes returning the system 10 to the normal high-pressure operation.

By the addition of an optional stage consisting of an additional control valve 46, chemical tank 26, conduits 56 and 60 and valves 58 and 62 another chemical solution may be provided and dispensed and this sytem 10 may have any number of additional stages added in parallel.

Whereas the present invention has been described in particular relation to the drawings attached hereto, it should be understood that other and further modifications apart from those shown or suggested herein, may be made within the scope and spirit of this invention.

What is claimed is:

1. A pumping system for supplying liquid at a selected pressure to a liquid applicator means comprising:
   a pump having an inlet and outlet portion, said inlet portion of said pump in communication with a first liquid supply;
   said outlet portion in communication with said liquid applicator means;
   a second liquid supply in communication with said inlet portion of said pump;
   supply valve means in communication with said first and second liquid supplies; and
   by-pass means in communication with said pump to reduce the pressure of liquid supplied to said liquid applicator means, whereby when said supply valve means and said by-pass means are actuated liquid from said second liquid supply is supplied to said liquid applicator means at a pressure lower than liquid supplied from said first liquid supply.

2. A pumping system as in claim 1 wherein said system being a self-service car wash system.

3. A pumping system as in claim 1 wherein said liquid applicator means being spraying means.

4. A pumping system as in claim 3 wherein said spraying means being a boom and wand assembly.

5. A pumping system as in claim 1 wherein said pump being a high-pressure pump.

6. A pumping system as in claim 1 wherein electrical control means being in operative communication with said supply valve means and said by-pass means.

7. A pumping system as in claim 6 wherein said control means being coin operated.

8. A pumping system as in claim 6 wherein said control means being in communication with said pump.

9. A pumping system as in claim 8 wherein said control means having time delay means whereby when one of said liquid supplies is selected said system operates under a high-pressure cycle to quickly purge a previously selected fluid from said system before supplying another selected fluid.

10. A pumping system as in claim 9 wherein said time delay means being adjustable.

11. A pumping means as in claim 1 wherein said first liquid supply having means to add soap to said liquid.

12. A pumping system as in claim 1 wherein said second liquid supply being provided with a chemical solution.

13. A pumping system as in claim 1 wherein said supply valve means being a three-way valve.

14. A pumping system as in claim 13 wherein said three-way valve being electrically activated.

15. A pumping system as in claim 1 wherein said supply valve means being adapted to selectively permit liquid to be supplied from one of said liquid supplies.

16. A pumping system as in claim 1 wherein said by-pass means being in communication with said inlet and said outlet portions of said pump.

17. A pumping system as in claim 16 wherein said by-pass means comprising conduit means and a by-pass valve means connected thereto.

18. A pumping system as in claim 17 wherein said by-pass valve means being electrically activated.

19. A pumping system as in claim 17 wherein said by-pass means provided with pressure adjustment means.

20. A pumping system as in claim 19 wherein said pressure adjustment means being a valve connected to said conduit means.

21. A pumping system as in claim 20 wherein said valve being manually operated.

22. A pumping system as in claim 16 wherein said by-pass means being provided with a secondary by-pass means comprising a mechanical by-pass valve in communication with said inlet and said outlet portions of said pump.

23. A pumping system as in claim 1 wherein said system provided with means for operative connection of additional liquid supplies.

* * * * *